May 4, 1943.  J. P. MINTON  2,318,248

PHASE METER

Filed Feb. 21, 1940

Inventor
John P. Minton
By
Dallas R. Lamont
Attorney

Patented May 4, 1943

2,318,248

UNITED STATES PATENT OFFICE 2,318,248

PHASE METER

John P. Minton, Dallas, Tex., assignor, by mesne assignments, to Socony-Vacuum Oil Company, Incorporated, New York, N. Y., a corporation of New York Application February 21, 1940, Serial No. 320,131

2 Claims. (Cl. 172—245)

This invention relates to a method and apparatus for comparing the phase characteristics of two amplifiers and more particularly to means for measuring directly the phase angle imparted to two voltages in passing through the respective amplifiers.

It has always been of considerable importance to be able to determine the phase characteristics of seismograph amplifiers and other equipment used in connection with seismic exploration work. Technically, if one plots the phase characteristics versus frequency for any kind of an electrical network, it is well-known that the reciprocal of the slope of any line joining the origin to any point on the curve gives the velocity with which the electrical wave passes through the equipment. If the phase characteristic is represented by a straight line passing through the origin, then the reciprocal of this straight line is the velocity and is constant for all frequencies.

The question then of being able to measure the phase shift from one amplifier to another or from one complete seismograph channel to another complete channel, is of very substantial importance, in order that all the channels may duplicate.

In conducting geophysical surveys by the seismic method an explosive charge is detonated at one point to create seismic waves in the earth's surface. These seismic waves radiate from the point of disturbance in all directions and the wave train thus created is a complex one made up of a plurality of frequencies. Some of the waves travel directly from the shot point to detecting elements or geophones where they are converted into electrical energy that can be recorded by means of a recording galvanometer after amplification. Other waves instead of travelling directly to the geophones travel downwardly to the interfaces of substrata from which they are reflected to the geophones where they are detected. Other waves travel down to strata of greater density than the unconsolidated surface layer and are refracted along these strata to points where they will return to the surface and be detected by the geophones.

In the reflection method of seismic survey a plurality of geophone stations are used collaterally spaced from the shot point. Sometimes a single geophone is planted at each station and depending upon conditions encountered in a particular area it is sometimes necessary to use a plurality of geophones at each station. Regardless of the number of geophones used at each detecting station the waves detected at that station generate electrical signals in the geophone or geophones which are passed through a suitable amplifier and recorded, there being provided a separate amplifier for each geophone station. The signals from each of these amplifiers are recorded on separate traces on a limited width of recorder strip and form what is commonly referred to in the art as a seismogram of a particular spread when shot in one direction. Since the distances from shot point to detecting stations are relatively small as compared to the distances to which the reflected waves travel downwardly before being reflected from the interfaces of the substrata, the reflected waves when recorded on the traces are more or less in phase depending of course on the slope of the interface from which they have been reflected. One of the important features by means of which the interpreter of the seismogram is able to identify the reflections and distinguish them from other waves that are being recorded simultaneously with them is their in-phase characteristics. Therefore if one or more channels of the amplifiers used have phase characteristics that differ substantially from another, the in-phase relationship between the reflections on the traces of the record will be destroyed thereby making it very difficult to interpret the record.

In computing the slope of the interface from which a particular reflection has been reflected cognizance is taken of the period of time between the arrival of the reflection on one trace and the arrival of the same reflection on another trace. This period of time is known in the art as the "step-out" and may be any value from zero to several hundredths of a second. The interpreter in every instance must be able to read this period of time from the record to $1/1000$ of a second. From this it becomes readily apparent that any phase shift resulting from an amplifier would introduce substantial errors in the period of time representing the step-out. Since the slope of the interface from which these reflections have been reflected is computed from this step-out, this error will be carried throughout the computations and into the final profile of the area.

The present invention enables one to avoid the above-enumerated difficulties and eliminate errors such as those described resulting from phase shift that is occasioned by the amplifiers or by complete channels. By means of the method and apparatus hereinafter described in detail the phase differences or phase angle between the output voltages of the amplifiers can be measured directly for all frequencies that one is likely to encounter in seismic survey work and corrections for this phase shift can be made by a change of elements or by the introduction of phase correcting networks.

Therefore the primary object of this invention is the provision of means whereby amplifiers or complete channels can be compared one with the other for differences in phase characteristics and a direct reading can be made of these differences as occasioned by the amplifiers or complete channels.

Another object of the invention resides in the provision of means whereby a common voltage can be applied to the input of both a standard amplifier and one that is to be tested and a direct reading can be made of the phase angle existing between output voltages from these two amplifiers.

Still another object of this invention is the provision of means whereby one complete seismograph channel can be compared with another for differences in phase characteristics.

Other objects and advantages will become apparent from the following detailed description when considered with the drawing in which.

The principle on which this phase meter operates is that the same input current or voltage is applied to two amplifiers, the standard and the one under test. A minute portion of the output current from each amplifier is passed through a resistance common to both output circuits. If these two currents or voltages are in phase a voltmeter connected in the circuit across the resistance will read a maximum voltage across the resistance and if the two currents are out of phase by 180, the voltmeter will read zero, that is, if the two components of currents through this common resistance are adjusted independently to equality. Instead of the meter scale reading voltage across this common output resistance the scale can be calibrated to read relative phase angle directly for all angles between zero and 180°.

Figure 1:
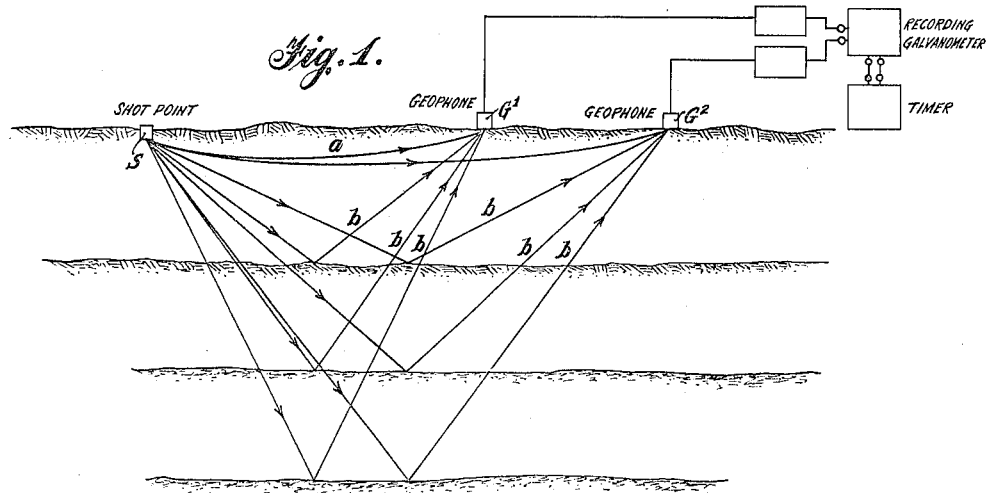
Figure 1 is a diagrammatic illustration of a reflection seismograph operation showing the paths followed by the waves and the recording apparatus in block diagram.
Figure 2:
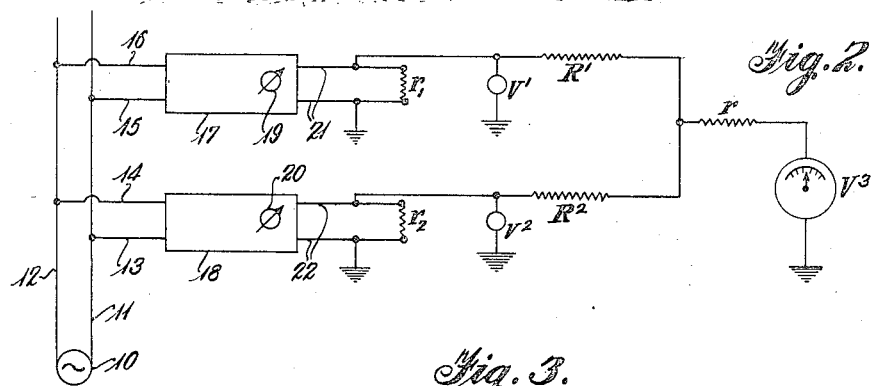
Figure 2 is a diagrammatic illustration of the phase meter forming the subject matter of this application.

Referring to Figure 2 a voltage E from a source 10 is conducted to the input of the amplifiers by leads 11, 12, 13, 14, 15 and 16. The input of amplifier 17 is connected directly in parallel with amplifier 18. Both amplifiers 17 and 18 are equipped with volume controls 19 and 20 by means of which their output signal strengths can be adjusted. Load resistors $r_1$ and $r_2$ are connected in the output circuits of amplifiers 17 and 18 by means of leads 21 and 22. Since one end of each of the load resistors $r_1$ and $r_2$ is grounded the output signals from the amplifiers, by the current passing through these resistors, develop voltages equal to the IR drops across them. By connecting voltmeters across these two load resistors the voltages thus developed across each can be compared, then by adjusting the volume controls 19 and 20 they can be made equal in amplitude. The equal voltages developed across the load resistors $r_1$ and $r_2$ cause current to flow through the resistors $R_1$ and $R_2$, a resistance $r$, and the meter $V_3$ to ground. The current through $r$ is therefore made up of two components, one from each of the amplifiers. If these two components of current are in phase and equal, the voltmeter $V_3$ will read a maximum value which will be equal to the value indicated by either of the meters $V_1$ or $V_2$. However, if the two components of current are 180° out of phase, the voltages as indicated by the meters $V_1$ and $V_2$ being equal, the voltmeter $V_3$ will read zero. From this it becomes readily apparent that one can plot a calibration curve from which a scale for the voltmeter can be made that will read relative phase angle directly.

The resistances $R_1$ and $R_2$ are decoupling resistors and are very high in value as compared to the load resistors $r_1$ and $r_2$. These resistances are placed in the circuit to prevent currents from the output circuit of one amplifier from feeding over into the output circuit of other amplifiers. The value of resistance $r$ is relatively high in comparison to $R_1$ and $R_2$.

With an arrangement such as described above in detail it is possible to compare directly the phase characteristics of amplifiers or of complete channels used in an electrical seismograph and make corrections that will give them all identical phase characteristics.

Figure 3:
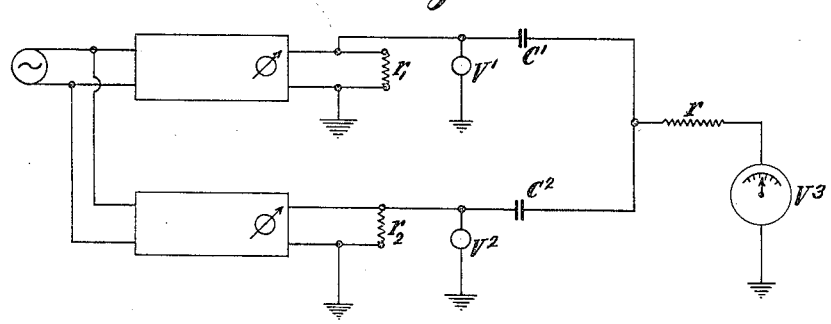
Figure 3 is a modification of the phase meter shown in Figure 2 that comprises an alternative method for directly measuring the phase angle between two voltages.

In Figure 3 there is shown another arrangement of elements by means of which the same results described in connection with Figure 2 can be accomplished. The apparatus as shown in Figure 3 differs from that shown in Figure 2 in that the resistances $R_1$ and $R_2$ have been replaced by capacitances $C_1$ and $C_2$. If proper values are selected for the capacitances $C_1$ and $C_2$ this circuit arrangement will work equally as well as that shown in Figure 2. This however would not be the case if inductances were used in place of the resistors $R_1$ and $R_2$, for inductances would produce a mutual coupling effect between the two that would make it impossible to read the results directly on the meter $V_3$ in terms of phase angle relationship between the voltages.

Figure 4:
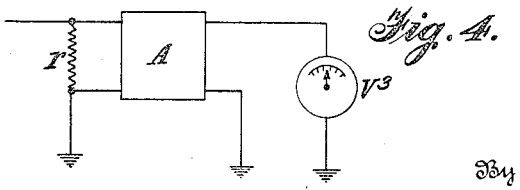
Figure 4 shows still another modification of the invention that is adaptable for use with the arrangements shown in either Figure 2 or 3.

In some instances the value of current through the resistance $r$ is so small that the IR drop developed across this resistance will not be sufficient to actuate a meter. Whenever such a condition is encountered the voltage across $r$ is passed through an amplifier A as shown in Figure 4 before it is impressed across the meter $V_3$. Since a voltage resulting from both components of the current passing through $r$ is amplified, any peculiar phase characteristics existing in the amplifier A would be nullified since they act on both components of voltage in the same manner.

Although the instant invention has been described specifically in connection with the testing of seismograph amplifiers for differences in phase characteristics it is also applicable for testing an entire channel from the geophone through the amplifier, to and including the recording galvanometer circuits. Errors are often made in the design of geophones which make their phase characteristics inherently different.

In the arrangement shown in Figure 3 the capacitances $C_1$ or $C_2$ can be supplemented by a variable capacitance by means of which it will be possible to determine which current or voltage is leading the other.

I claim:

1. A method for directly and visibly comparing the phase characteristics of two amplifiers that comprises the steps of separately amplifying voltages from a common source, separately equalizing the amplitude of the separately amplified voltages, algebraically and electrically adding the separately amplified voltages, amplifying the algebraic sum of the two separately amplified voltages, and indicating directly their relative phase angle.

2. A method for directly and visibly comparing the phase characteristics of two channels of an electric seismograph that comprises the steps of separately amplifying voltages from a common source, separately equalizing the amplitude of the separately amplified voltages, algebraically and electrically adding the separately amplified voltages, amplifying the algebraic sum of the two separately amplified voltages, and indicating directly their relative phase angle.

JOHN P. MINTON.